(12) United States Patent
Vargantwar et al.

(10) Patent No.: US 8,331,974 B1
(45) Date of Patent: Dec. 11, 2012

(54) CONTROL OF POWER LEVEL COMMANDS IN WIRELESS DEVICES

(75) Inventors: Sachin R. Vargantwar, Overland Park, KS (US); Debasish Sarkar, Irvine, CA (US); Manoj Shetty, Overland Park, KS (US)

(73) Assignee: Sprint Communications Company L.P., Overland, KS (US)

( * ) Notice: Subject to any disclaimer, the term of this patent is extended or adjusted under 35 U.S.C. 154(b) by 1157 days.

(21) Appl. No.: 12/185,927

(22) Filed: Aug. 5, 2008

(51) Int. Cl.
*H04B 7/00* (2006.01)

(52) U.S. Cl. .................... 455/522; 455/127.1; 455/63.1; 455/501; 370/318

(58) Field of Classification Search .................. 370/448, 370/318, 328–331, 341, 347; 455/450, 451, 455/452.1, 452.2, 453, 561, 562.1, 63.1, 455/63.4, 501, 522, 127.1
See application file for complete search history.

(56) References Cited

U.S. PATENT DOCUMENTS

| | | | |
|---|---|---|---|
| 6,853,844 B2 * | 2/2005 | Iwamura | 455/442 |
| 7,925,270 B1 * | 4/2011 | Johnson | 455/452.1 |
| 8,160,629 B2 * | 4/2012 | Mate et al. | 455/522 |
| 2006/0166673 A1 | 7/2006 | Vasudevan | |
| 2010/0081424 A1 * | 4/2010 | Suh et al. | 455/422.1 |
| 2010/0232534 A1 * | 9/2010 | Lee et al. | 375/267 |
| 2011/0051685 A1 * | 3/2011 | Saitou | 370/331 |

* cited by examiner

*Primary Examiner* — Sujatha Sharma

(57) ABSTRACT

What is disclosed is a system and method of operating a wireless communication device, which includes transferring user communications over a first wireless link to a first wireless access node, receiving a first control signal from the first wireless access node and a receiving a second control signal from a second wireless access node, where the first control signal indicates a first power request for the user communications over the first wireless link of the wireless communication device and the second control signal indicates a second power request for the user communications over the first wireless link of the wireless communication device. The system and method also includes determining an estimated contribution of the user communications over the first wireless link to a noise level at the second wireless access node and denying the second control signal from the second wireless access node if the estimated contribution is below a threshold level.

28 Claims, 6 Drawing Sheets

CONTROL OF POWER LEVEL COMMANDS IN WIRELESS DEVICES

TECHNICAL FIELD

Aspects of the embodiments are related to the field of communications, and in particular, to wireless communication network architectures and devices.

TECHNICAL BACKGROUND

Wireless communication networks typically include wireless communication devices which, via a communication system, communicate with further communication networks and equipment. The communication system typically includes antennas, base stations, wireless access nodes, and other associated equipment to route communications over wireless links from the wireless communication devices to further communication networks, equipment, and destinations. Each wireless communication device typically exchanges communications with one wireless access node at a time, while remaining in contact with possibly several other wireless access nodes. The wireless access nodes can transfer control signals to the wireless communication devices.

However, communications to and from the wireless communication devices over the wireless links can be disruptive to other wireless communication devices and other wireless access nodes. Wireless access nodes are typically placed in geographically advantageous places to form a wireless network coverage area. Wireless communication devices in communication with wireless access nodes typically maintain a power level to allow for user communications with a primary wireless access node. These user communications can interfere with other wireless access nodes. Wireless access nodes typically send control signals to wireless communication devices to control power levels to limit noise or interference of communications with other wireless communication devices.

For example, the control signals could include reverse activity bits, a reverse activity channel, power control bits, a power control channel, media access channel (MAC), or other control signals. The control signals communicate control, status request, or commands to the wireless communication devices. Some examples of the control signals include a request of a transmission power level of the wireless communication devices. Wireless communication devices typically interpret these control signals and act in accordance to, for example, reduce transmission power of communications with wireless access nodes.

Overview

What is disclosed is a method of operating a wireless communication device, which includes transferring user communications over a first wireless link to a first wireless access node, receiving a first control signal from the first wireless access node and a receiving a second control signal from a second wireless access node, where the first control signal indicates a first power request for the user communications over the first wireless link of the wireless communication device and the second control signal indicates a second power request for the user communications over the first wireless link of the wireless communication device. The method also includes determining an estimated contribution of the user communications over the first wireless link to a noise level at the second wireless access node and denying the second control signal from the second wireless access node if the estimated contribution is below a threshold level.

Also disclosed is a wireless communication device, which includes a communication interface configured to transfer user communications over a first wireless link to a first wireless access node, receive a first control signal from the first wireless access node and a second control signal from a second wireless access node, wherein the first control signal indicates a first power request for the user communications over the first wireless link of the wireless communication device and the second control signal indicates a second power request for the user communications over the first wireless link of the wireless communication device. The wireless communication device also includes a processing system configured to determine an estimated contribution of the user communications over the first wireless link to a noise level at the second wireless access node and direct the communication interface to deny the second control signal from the second wireless access node if the estimated contribution is below a threshold level.

Also disclosed is a method of operating a wireless communication device, which includes transferring user communications over a first wireless link to a first wireless access node, receiving a first control signal from the first wireless access node, receiving a second control signal from a second wireless access node, and a receiving a third control signal from a third wireless access node, wherein the first control signal indicates a first power request for the user communications over the first wireless link of the wireless communication device, the second control signal indicates a second power request for the user communications over the first wireless link of the wireless communication device, and the third control signal indicates a third power request for the user communications over the first wireless link of the wireless communication device. The method also includes determining a first estimated contribution of the user communications over the first wireless link to a first noise level at the second wireless access node and determining a second estimated contribution of the user communications over the first wireless link to a second noise level at the third wireless access node. The method also includes denying the second control signal from the second wireless access node if the first estimated contribution is below a first threshold level and denying the third control signal from the third wireless access node if the second estimated contribution is below a second threshold level.

Also disclosed is a wireless communication device, which includes a communication interface configured to transfer user communications over a first wireless link to a first wireless access node, receive a first control signal from the first wireless access node, a second control signal from a second wireless access node, and a third control signal from a third wireless access node, wherein the first control signal indicates a first power request for the user communications over the first wireless link of the wireless communication device, the second control signal indicates a second power request for the user communications over the first wireless link of the wireless communication device, and the third control signal indicates a third power request for the user communications over the first wireless link of the wireless communication device. The wireless communication device also includes a processing system configured to determine a first estimated contribution of the user communications over the first wireless link to a first noise level at the second wireless access node, determine a second estimated contribution of the user communications over the first wireless link to a second noise level at the third wireless access node, direct the communication interface to deny the second control signal from the second wireless access node if the first estimated contribution is below a first threshold level, and direct the communication interface to deny the third control signal from the third wireless access node if the second estimated contribution is below a second threshold level.

BRIEF DESCRIPTION OF THE DRAWINGS

In the drawings, like reference numerals designate corresponding parts throughout the several views.

DETAILED DESCRIPTION

Figure 1:
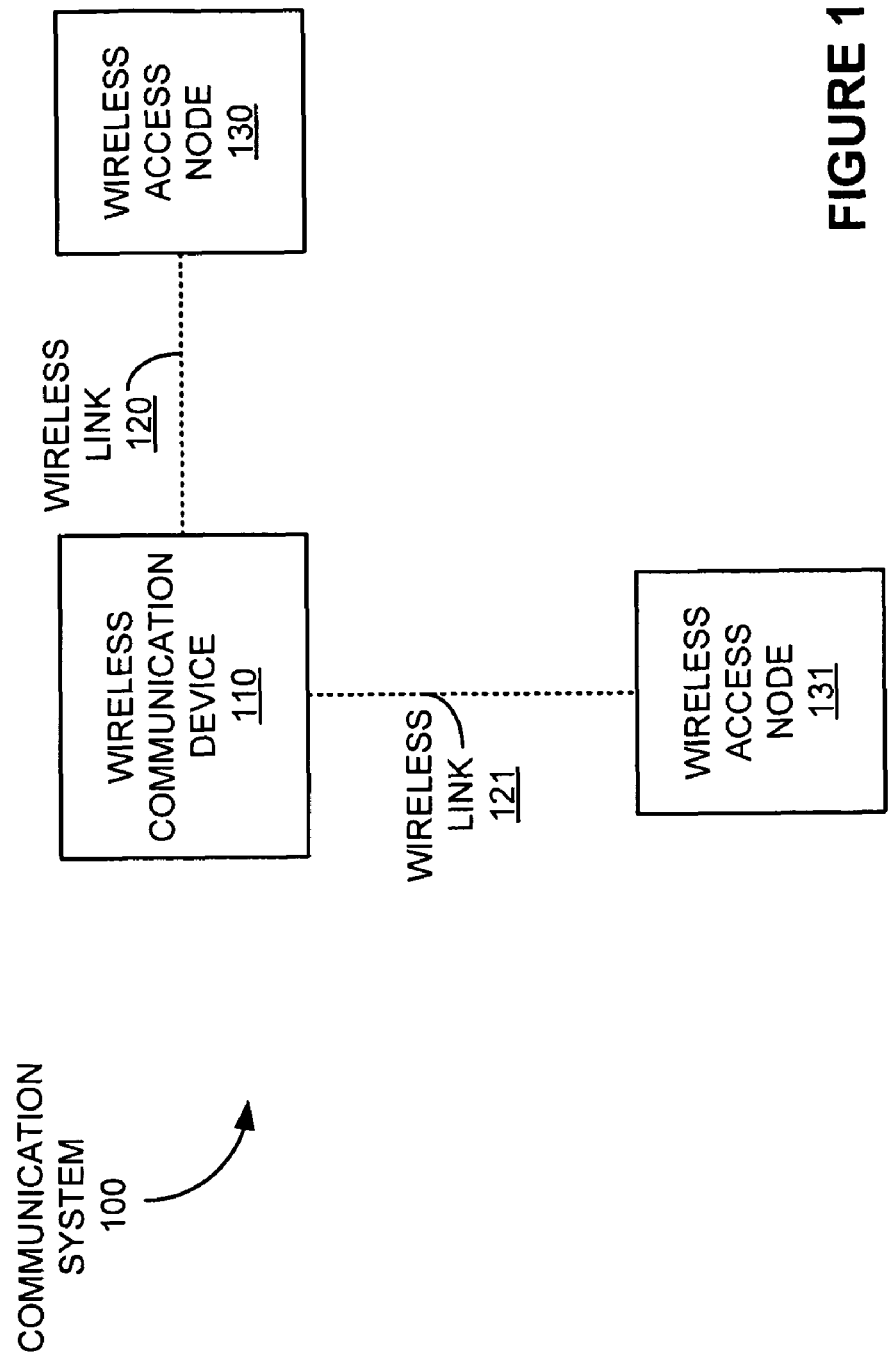
FIG. 1 is a system diagram illustrating a communication system.

FIG. 1 shows a system diagram illustrating communication system 100. Included in FIG. 1 are wireless communication device 110, wireless access node 130, and wireless access node 131. Wireless communication device 110 and wireless access node 130 communicate via wireless link 120. Wireless communication device 110 and wireless access node 131 communicate via wireless link 121.

Wireless communication device 110 and wireless access node 130 transfer communications and control signals over wireless link 120. Wireless communication device 110 and wireless access node 131 can transfer communications and control signals over wireless link 121. Wireless access nodes 130 and 131 could be configured to further exchange communications with other systems not shown in FIG. 1.

Wireless communication device 110 comprises a telephone, transceiver, computer, digital assistant, Internet appliance, or some other wireless communication apparatus— including combinations thereof. Wireless access nodes 130 and 131 can be any type of communications network equipment capable of communicating with wireless communication device 110. Examples of wireless access nodes 130 and 131 include wireless base stations, base transceiver stations, antennas, radio node controllers (RNC), mobile switching controllers, call processing equipment, wireless access points, telephone switches, Internet routers, network gateways, as well as other type of communication equipment— including combinations thereof.

Wireless links 120 and 121 use various communication media, such as air, space, or some other wireless transport media—including combinations thereof. Wireless links 120 and 121 use various protocols, such as wireless fidelity (WiFi), code division multiple access (CDMA), Global System for Mobile communications (GSM), worldwide interoperability for microwave access (WiMAX), long-term evolution (LTE), or some other communication format—including combinations or variations thereof.

Wireless links 120 and 121 may comprise many different signals sharing the same link. Wireless links 120 and 121 could include multiple signals operating in a single "airpath"—as represented by the dashed lines in FIG. 1—comprising multiple frequencies, timeslots, packets, or communication directions. For example, communications and control signals between wireless communication device 110 and wireless access node 130 could share the same wireless link 120, but be transferred over different frequencies, timeslots, packets, or in different directions—including combinations thereof. Communications and control signals between wireless communication device 110 and wireless access node 131 could operate in a similar fashion.

Figure 2:
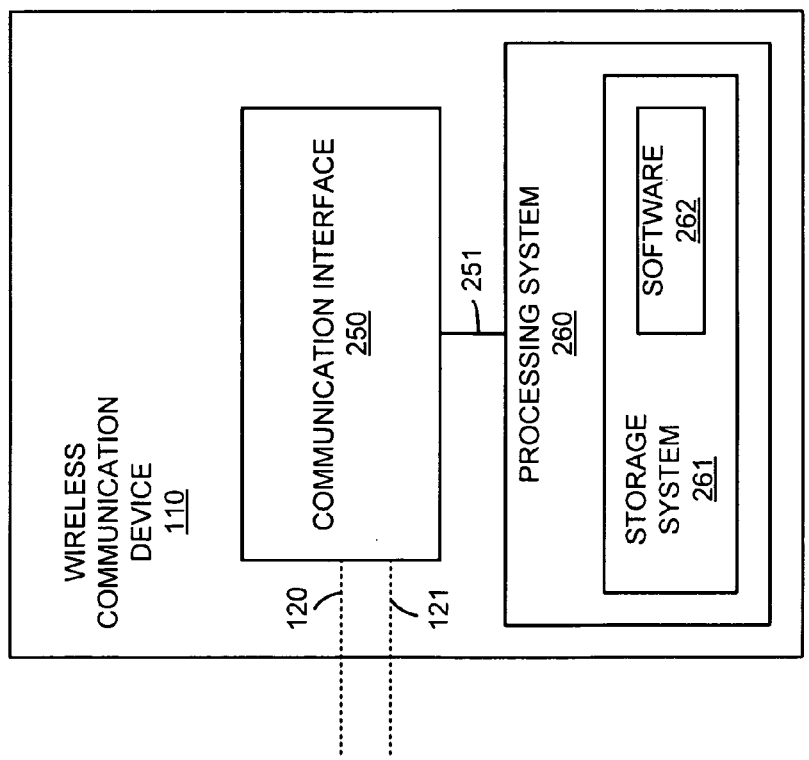
FIG. 2 is a block diagram illustrating a wireless communication device.

FIG. 2 illustrates a block diagram of wireless communication device 110. Wireless communication device 110 includes communication interface 250 and processing system 260. Processing system 260 includes storage system 261. Storage system 261 stores software 262, which includes data to be retrieved and instructions to be executed by processing system 260 to perform the various functions described herein. Processing system 260 is communicatively linked to communication interface 250 by link 251. Wireless communication device 110 may be distributed among multiple devices that together form elements 250, 251, 260-262.

Communication interface 250 comprises antennas, transceivers, circuitry, as well as other types of communication components—including combinations thereof.

Processing system 260 retrieves and executes software 262 from storage system 261. Processing system 260 could incorporate a computer microprocessor, logic circuit, or some other processing device, and may be distributed among multiple processing devices. In some examples, processing system 260 is located within the same equipment in which communication interface 250 is located. Storage system 261 could include a computer-readable medium such as a disk, tape, integrated circuit, server, or some other memory device, and also may be distributed among multiple memory devices. Software 262 may include an operating system, logs, utilities, drivers, networking software, and other software typically loaded onto a computer system. Software 262 could contain an application program, firmware, or some other form of computer-readable processing instructions. When executed by processing system 260, software 262 directs processing system 260 to operate as described herein.

Link 251 comprises a physical, logical, or virtual communication link between communication interface 250 and processing system 260, capable of communicating service control signals and communications, along with other information. In some examples, link 251 is encapsulated within the elements of communication interface 250 or processing system 260 and may be a software or logical link. In other examples, link 251 uses various communication media, such as air, space, metal, optical fiber, or some other signal propagation path—including combinations thereof. Link 251 could be wired or wireless and use various protocols or communication formats as described for wireless links 120 and 121—including combinations or variations thereof. Link 251 could be a direct link or it might include various equipment, intermediate components, systems, and networks.

Figure 3:
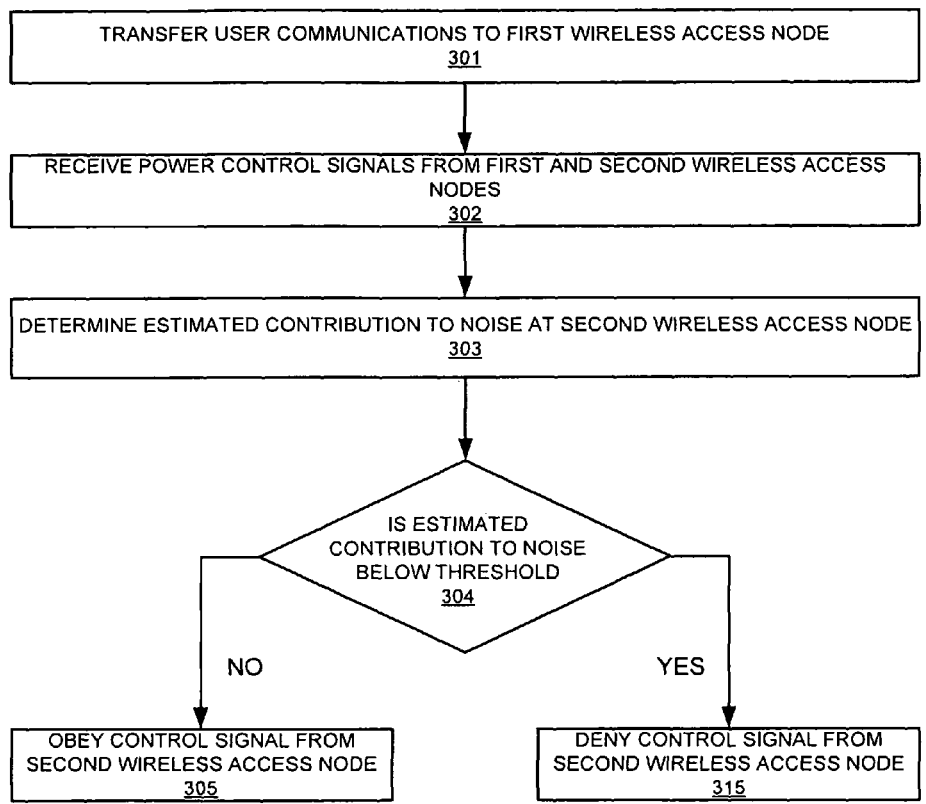
FIG. 3 is a flow diagram illustrating a method of operation of a wireless communication device.

FIG. 3 is a flow diagram that illustrates a method of operation of wireless communication system 100. The phases shown in FIG. 3 are indicated herein parenthetically. In FIG. 3, wireless communication device 110 and wireless access node 130 are in communication, whereby wireless communication device 110 transfers (301) communications to a wireless access node 130 over wireless link 120.

Wireless communication device 110 receives (302) control signals from wireless access nodes 130 and 131. The control signals communicate control information, status requests, or commands to wireless communication device 110. Some examples of the control signals include a request of a transmission power level of wireless communication device 110. Other examples of the control signal include a request of a bit rate or data transfer rate of wireless communication device

110. The control signals comprise reverse activity bits, a reverse activity channel, power control bits, a power control channel, a media access channel (MAC), or other control signals—including combinations thereof. Wireless communication device 110 typically interprets these control signals and acts in accordance, for example, to reduce transmission power or possibly data transfer rate of communications with wireless access node 130.

As discussed above, wireless communication device 110 exchanges user communications with wireless access node 130, and receives control signals from both wireless access node 130 and wireless access node 131. Wireless access node 131 may want to influence or control the power level of wireless communication device 110 even though wireless communication device 110 is exchanging user communications with wireless access node 130, not wireless access node 131. This may be the case, in some examples, when a noise level as perceived by wireless access node 131 is made higher due to the transmissions of wireless communication device 110 with wireless access node 130.

However, a reduction in power level of wireless communication device 110 may have adverse effects on its user communications with wireless access node 130. For example, wireless communication device 110 may be in an area where it must transmit at a high power level to maintain reliable user communications with wireless access node 130. In other examples, wireless communication device 110 may be engaging in high bit rate activity facilitated by a particular power level, and not desire to reduce the power level. Wireless communication device 110 cannot simply ignore the control signals from wireless access node 131 and continue to operate at a higher power level. If wireless communication device 110 were to do so, it may have adverse effects upon wireless access node 131.

If wireless communication device 110 is not exchanging user communications with wireless access node 131, but instead exchanging user communications instead with another wireless access node (i.e. 130), then the user communications of wireless communication device 110 could be interpreted as interference or contribute to the noise level at the wireless access node that the wireless communication device is not exchanging user communications with (i.e. wireless access node 131)—possibly leading to adverse effects upon wireless access node 131, such as degraded operations or degraded user communications between wireless access node 131 and other wireless communication devices. Such adverse effects could include RF interference, communication interference, overpowering other signals, as well as lowering the quality-of-service, lowering the quality-of-experience, or inhibiting user communications of other wireless communication devices with wireless access node 131.

Wireless communication device 110 determines (303) an estimated contribution of wireless communication device 110 to adverse effects, noise, interference, or other effects at wireless access node 131. Wireless communication device 110 could determine its estimated contribution by many methods. In one example, this method includes determining a signal-to-noise ratio at wireless access node 131. In another example, this method includes determining a change in the signal-to-noise ratio at wireless access node 131 caused by wireless communication device 110 exchanging user communications with wireless access node 130. In yet another example, this method includes determining a change in the noise level at wireless access node 131 caused by wireless communication device 110 exchanging user communications with wireless access node 130. In other examples, wireless communication device 110 determines the estimated contribution by determining its location or distance from wireless access node 131 or wireless access node 130. This distance can be determined by many methods as well, including using a geographic location, global-positioning systems (GPS), triangulation, RF signal quality, or the emergency services location procedures, as well as other methods.

If the estimated contribution to the adverse effects at wireless access node 131 caused by wireless communication device 110 exchanging user communications with wireless access node 130 does is below (304) a certain threshold level, then wireless communication device 110 denies (315) the control signal from wireless access node 131. However, if the estimated contribution to the adverse effects at wireless access node 131 caused by wireless communication device exchanging user communications with wireless access node 130 exceeds (304) a certain threshold level, then wireless communication device 110 obeys (305) the control signal from wireless access node 131.

Advantageously, wireless communication device 110 maintains user communications with wireless access node 130 without causing significant degradation or interference in the operations of wireless access node 131. For example, wireless communication device 110 may be distant from wireless access node 131 while the communications of wireless communication device 110 with wireless access node 130 is not a significant contributor to the noise level at wireless access node 131. Likewise, in other examples, wireless communication device 110 may be distant from both wireless access node 130 and wireless access node 131, but in order to maintain user communications with wireless access node 130, wireless communication device 110 must transmit user communications via high RF energy. If the estimated contribution of these user communications to the adverse effects at wireless access node 131 is below an acceptable level, then wireless communication device 110 could maintain a high RF transmission energy without inhibiting operations or communications of wireless access node 131.

Figure 4:
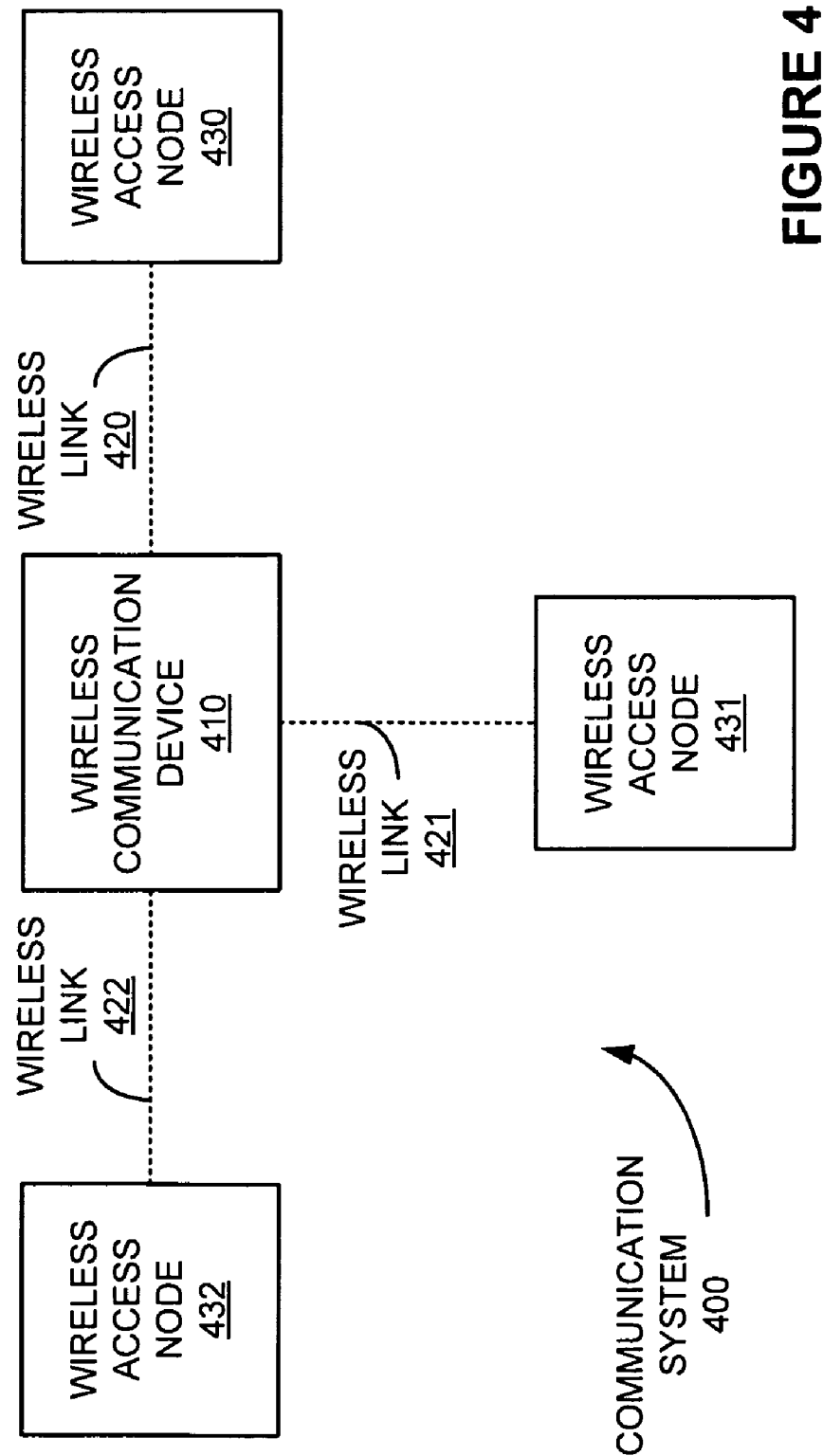
FIG. 4 is a system diagram illustrating a communication system.

FIG. 4 shows a system diagram illustrating communication system 400. Included in FIG. 4 are wireless communication device 410 and wireless access nodes 430-432. Wireless communication device 410 and wireless access nodes 430-432 communicate over wireless links 420-422, respectively.

Wireless communication device 410 and wireless access node 430 can transfer communications and control signals over wireless link 420. Wireless communication device 410 and wireless access node 431 can transfer communications and control signals over wireless link 421. Wireless communication device 410 and wireless access node 432 can transfer communications and control signals over wireless link 422. Communications transferred and received by wireless access nodes 430-432 could be further exchanged with other systems not shown in FIG. 4.

Wireless communication device 410 comprises a telephone, transceiver, computer, digital assistant, Internet appliance, or some other wireless communication apparatus—including combinations thereof. Wireless access nodes 430-432 can be any type of communications network equipment capable of communicating with wireless communication device 410. Examples of wireless access nodes 430-432 include wireless base stations, base transceiver stations, antennas, radio node controllers (RNC), mobile switching controllers, call processing equipment, wireless access points, telephone switches, Internet routers, network gateways, as well as other type of communication equipment—including combinations thereof.

Wireless links 420-422 use various communication media, such as air, space, or some other wireless transport media—including combinations thereof. Wireless links 420-422 could use various protocols, such as wireless fidelity (WiFi), code division multiple access (CDMA), global system for mobile communications (GSM), worldwide interoperability for microwave access (WiMAX), long-term evolution (LTE), or some other communication format—including combinations or variations thereof.

Wireless links 420-422 may comprise many different signals sharing the same link. Wireless links 420-422 could include multiple signals operating in a single "airpath"—as represented by the dashed lines in FIG. 4—comprising multiple frequencies, timeslots, packets, or communication directions. For example, communications and control signals between wireless communication device 410 and wireless access node 430 could share the same wireless link 420, but be transferred over different frequencies, timeslots, packets, or in different directions—including combinations thereof. Communications and control signals between wireless communication device 410 and wireless access nodes 431 and 432 could operate in a similar fashion.

Figure 5:
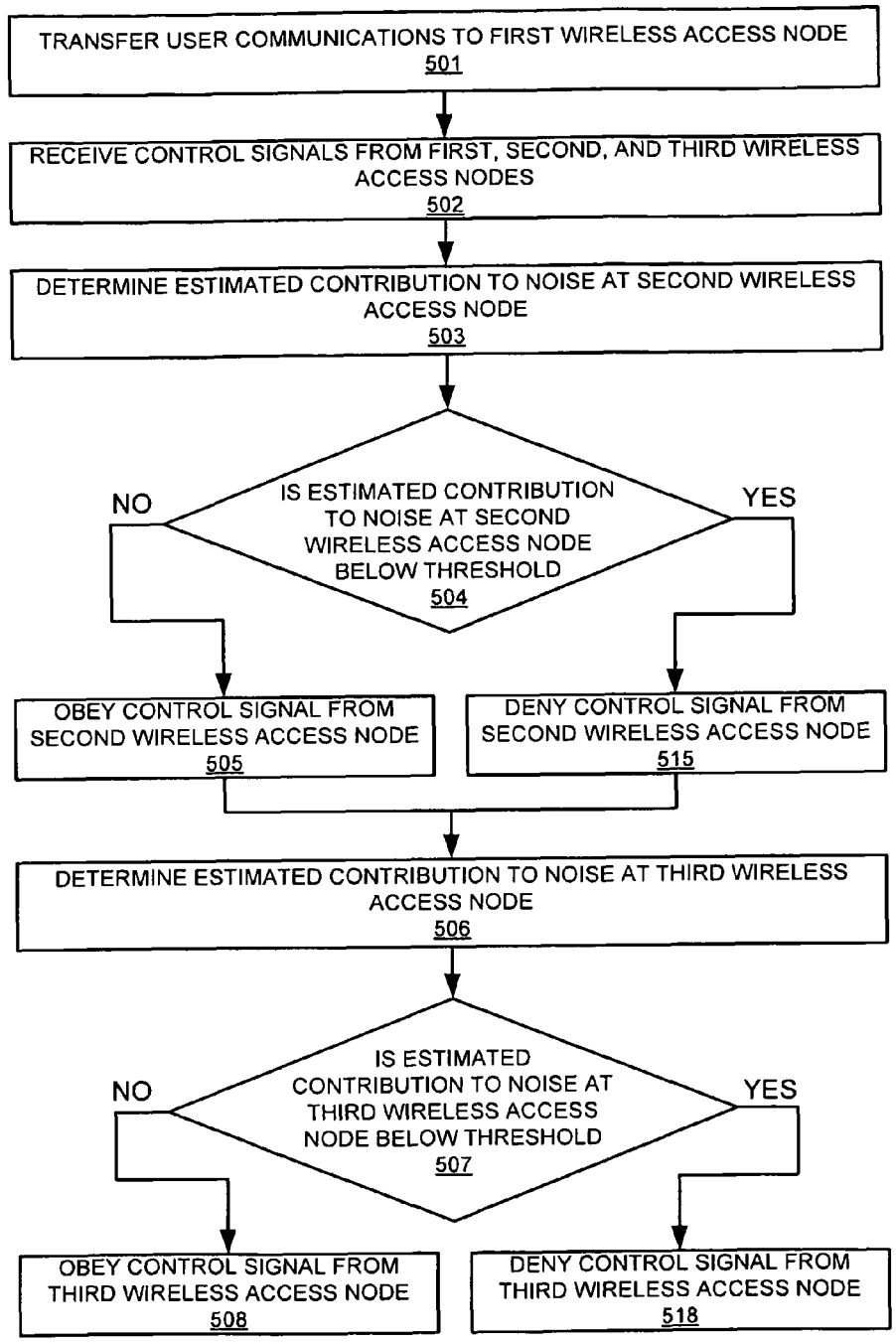
FIG. 5 is a flow diagram illustrating a method of operation of a wireless communication device.

FIG. 5 is a flow diagram that illustrates a method of operation of communication system 400. The phases shown in FIG. 5 are indicated herein parenthetically. In FIG. 5, wireless communication device 410 and wireless access node 430 are in communication, whereby wireless communication device 410 transfers (501) user communications to a wireless access node 430 over wireless link 420.

Wireless communication device 410 receives (502) control signals from wireless access nodes 430-432. The control signals communicate control information, status requests, or commands to wireless communication device 410. Some examples of the control signals include a request of a transmission power level of wireless communication device 410. Other examples of the control signal include a request of a bit rate or data transfer rate of wireless communication device 410. The control signals comprise reverse activity bits, a reverse activity channel, power control bits, a power control channel, a media access channel (MAC), or other control signals—including combinations thereof. Wireless communication device 410 typically interprets these control signals and acts in accordance, for example, to reduce transmission power or possibly data transfer rate of user communications with wireless access node 430.

As discussed above, wireless communication device 410 transfers user communications to wireless access node 430, and receives control signals from wireless access nodes 430-432. Wireless access nodes 431 or 432 may want to influence or control the power level of wireless communication device 410 even though wireless communication device 410 is exchanging user communication with wireless access node 430, not wireless access nodes 431 or 432. This may be the case, in some examples, when a noise level as perceived by wireless access node 431 or 432 is made higher due to the transmissions of wireless communication device 410 with wireless access node 430.

However, a reduction in power level of wireless communication device 410 may have adverse effects on its exchange of user communications with wireless access node 430. For example, wireless communication device 410 may be in an area where it must transmit at a high power level to maintain reliable communications with wireless access node 430. In other examples, wireless communication device 410 may be engaging in high bit rate activity facilitated by a certain power level, and not desire reduce the power level. Wireless communication device 410 cannot simply ignore the control signals from wireless access nodes 431 and 432 and continue to operate at a higher power level. If wireless communication device 410 were to do so, it may have adverse effects upon wireless access nodes 431 and 432.

If wireless communication device 410 is not exchanging user communications with wireless access nodes 431 or 432, but instead with another wireless access node (i.e. wireless access node 430), then the user communications of wireless communication device 410 could be interpreted as interference or contribute to the noise level at the wireless access node that the wireless communication device is not communicating with (i.e. wireless access nodes 431 or 432)—possibly leading to adverse effects upon wireless access nodes 431/432, such as degraded operations, degraded communications, or other adverse effects between wireless access nodes 431/432 and other wireless communication devices. Such adverse effects could include RF interference, communication interference, overpowering other signals, as well as lowering the quality-of-service, lowering the quality-of-experience, or inhibiting user communications of other wireless communication devices with wireless access nodes 431/432.

Wireless communication device 410 determines (503) an estimated contribution of wireless communication device 410 to adverse effects, noise, or other effects at wireless access node 431. Wireless communication device 410 could determine the estimated contribution by many methods. In one example, this method includes determining a signal-to-noise ratio at wireless access node 431. In another example, this method includes determining a change in the signal-to-noise ratio at wireless access node 431 caused by wireless communication device 410 exchanging user communications with wireless access node 430. In yet another example, this method includes determining a change in the noise level at wireless access node 431 caused by wireless communication device 410 exchanging user communications with wireless access node 430. In other examples, wireless communication device 410 determines the estimated contribution by determining its location or distance from wireless access node 431 or wireless access node 430. This distance can be determined by many methods as well, including using a geographic location, global-positioning systems (GPS), triangulation, RF signal quality, or the emergency services location procedures, as well as other methods.

If the estimated contribution to the adverse effects at wireless access node 431 is below (504) a certain threshold level, then wireless communication device 410 denies (515) the control signal from wireless access node 431. However, if the estimated contribution to the adverse effects at wireless access node 431 exceeds (504) a certain threshold level, then wireless communication device 410 obeys (505) the control signal from wireless access node 431.

Wireless communication device 410 determines (506) an estimated contribution of wireless communication device 410 to adverse effects, noise, or other effects at wireless access node 432. Wireless communication device 410 could determine the estimated contribution by many methods, as discussed above with regards to wireless access node 431. Additionally, when multiple wireless access nodes exist which are not exchanging user communications with wireless communication device 410, consideration could be given to all wireless access nodes sending control signals to wireless communication device 410 when determining the estimated contribution. In some examples, a balanced power level is determined which considers the adverse effects at both wireless access node 431 and wireless access node 432. In other examples, one wireless access node could be favored over another in determining an estimated contribution. Additionally, in some examples, the estimated contribution to a noise level may have a separate threshold for each wireless access node sending control signals to wireless communication device 410. In yet other examples, if more than one wireless access node is using a control signal to request a change in power level, then wireless communication device 410 could obey the control signals on a majority vote, plurality basis, or other basis instead of or in addition to considering an estimated contribution to adverse effects at each wireless access node.

In this manner, if the estimated contribution to the adverse effects or the noise at wireless access node 432 is below (507) a certain threshold level, then wireless communication device 410 denies (518) the control signal from wireless access node 432. However, if the estimated contribution to the adverse effects or the noise at wireless access node 432 exceeds (507) a certain threshold level, then wireless communication device 410 obeys (508) the control signal from wireless access node 432. As mentioned above, this determination could also consider the quantity of wireless access nodes requesting change in power level to wireless communication device 410.

Advantageously, wireless communication device 410 maintains user communications with wireless access node 430 without interfering or causing significant degradation in the operations of wireless access nodes 431 and 432. For example, wireless communication device 410 may be distant from wireless access nodes 431 or 432, while wireless communication device 410 exchanging user communications with wireless access node 430 is not a significant contributor to the noise level at wireless access nodes 431 or 432. Likewise, in other examples, wireless communication device 410 may be distant from wireless access nodes 430-432, but in order to maintain user communications with wireless access node 430, wireless communication device 410 must transmit user communications via high RF energy. If the estimated contribution of this user communication to the adverse effects at wireless access nodes 431 or 432 is below an acceptable level, then wireless communication device 410 could maintain a high RF transmission energy without inhibiting operations or communications of wireless access nodes 431 and 432.

Figure 6:
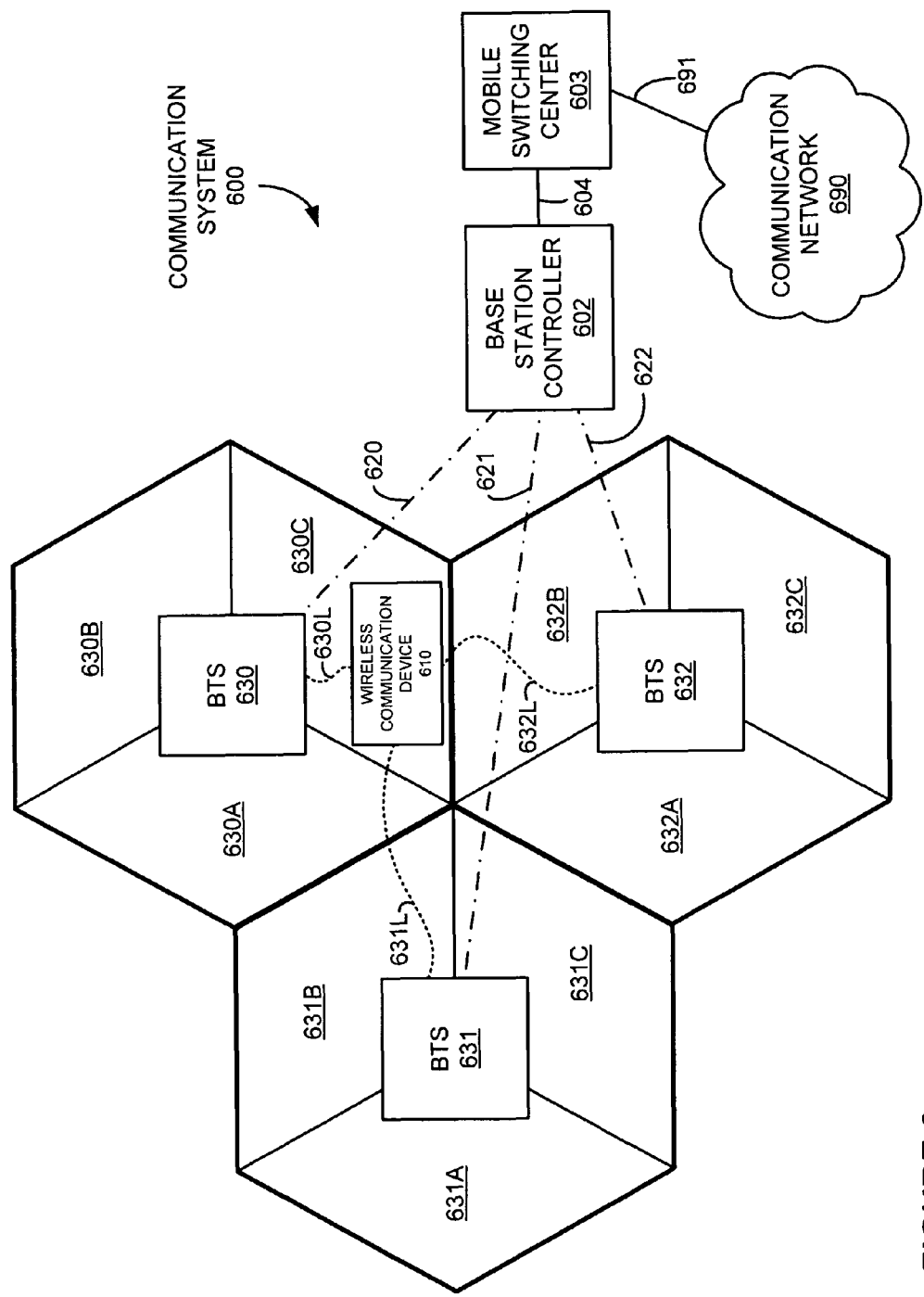
FIG. 6 is a system diagram illustrating a communication system.

FIG. 6 shows a system diagram illustrating communication system 600. Included in communication system 600 are wireless communication device 610, base station controller 602, mobile switching center (MSC) 603, and base transceiver stations (BTS) 630-632. Also included in FIG. 6 is communication network 690.

Wireless communication device 610 and base transceiver stations 630-632 communicate over wireless links 630L-632L, respectively. Base transceiver stations 630-632 and base station controller 602 communicate over links 620-622, respectively. Wireless communication device 610 and BTS 630-632 can transfer communications and control signals over wireless links 630L-632L, respectively. Communications received in BTS 630-632 can be further exchanged with base station controller 602 over links 620-622, respectively. Base station controller 602 and mobile switching center 603 communicate over link 604. Mobile switching center 603 and communication network 690 communicate over link 691.

Wireless communication device 610 comprises a telephone, transceiver, computer, digital assistant, Internet appliance, or some other wireless communication apparatus—including combinations thereof. Base transceiver stations 630-632 include equipment for communicating and controlling wireless communication device 610. Base transceiver stations 630-632 could also include other types of communications network equipment capable of communicating with wireless communication device 610.

Base station controller 602 includes equipment for communicating with and controlling base transceiver stations 630-632. Base station controller 602 could also include other types of communications network equipment capable of communicating with base transceiver stations 630-632.

Mobile switching center 603 includes equipment for communicating with and controlling base station controller 602, as well as possibly other base station controllers not shown in FIG. 6. Mobile switching center 603 could also include other types of communications network equipment capable of communicating with base station controller 602. Examples include radio node controllers (RNC), authorization and accounting (AAA) equipment, telephone switches, routers, gateways, as well as other type of communication equipment—including combinations thereof.

In some examples, base station controller 602 is configured to monitor and control the operations of base transceiver stations 630-632, and mobile switching center 603 is configured to monitor and control the operations of base station controller 602. In other examples, the various elements of communication system 600 could operate more autonomously, mainly exchanging communications.

Communication network 690 comprises further communication systems, such as an Internet network, other wireless networks, or telephony networks.

Links 604, 620-622, and 691 use various communication media, such as air, space, metal, optical fiber, or some other signal propagation path—including combinations thereof. Links 604, 620-622, and 691 could be wired or wireless and use various protocols. Links 604, 620-622, and 691 could be direct links or it might include various equipment, intermediate components, systems, and networks.

Wireless links 630L-632L use various communication media, such as air, space, or some other wireless transport media—including combinations thereof. Wireless links 630L-632L could use various protocols, such as code division multiple access (CDMA), worldwide interoperability for microwave access (WiMAX), or other communication protocols. Wireless links 630L-632L may comprise many different signals sharing the same link. A wireless link could include multiple signals operating in a single "airpath"—as represented by the dashed lines in FIG. 6—comprising multiple frequencies, timeslots, packets, or communication directions.

For example, communications and control signals between wireless communication device 610 and base transceiver station 630 could share the same wireless link 630L, but be transferred over different frequencies, timeslots, packets, or in different directions—including combinations thereof. Communications and control signals between wireless communication device 610 and base transceiver stations 631 and 632 could operate in a similar fashion.

FIG. 6 shows sectors 630A-630C, 631A-631C, and 632A-632C. A sector can represent a particular region of wireless coverage in which wireless communication devices are located. In many examples, a sector is served by a single antenna, antenna tower, or base transceiver station. Wireless communication devices are located throughout the sectors. Although only wireless communication device 610 is shown in FIG. 6 for clarity and simplicity, it should be understood that in various examples of communication system 600, many wireless communication devices could be located in and distributed throughout the various sectors of communication system 600. The wireless communication devices are configured to communicate with base transceiver stations 630-632, base station controller 602, mobile switching center 603, communication network 690, and similarly, each other by way of communication system 600.

Communication system 600 includes base transceiver stations (BTS) 630-632 each situated in a separate hexagonal region of coverage, although in some examples a different number or configuration of base transceiver stations may be included. The hexagonal shape should be understood to be merely representative of an overhead view of a region of wireless coverage, and should not be interpreted as an exact physical representation of such region. Each hexagonal region includes 3 sectors in this example, denoted by the "A" "B" and "C" designators, although other configurations are possible.

In operation of communication system 600, communication system 600 exchanges communications between wireless communication devices as well as communication network 690. During this communications exchange, wireless communication device 610 exchanges user communications primarily with one base transceiver station, for example BTS 630. In addition to the user communications with BTS 630, wireless communication device 610 also is in contact with the other base transceiver stations 631/632 in communication system 600. Base transceiver stations 630-632 are configured to transfer control signals to wireless communication device 610.

The control signals communicate control information, status requests, or commands to wireless communication device 610. In this example, the control signals are reverse-activity bits (RAB), indicating to wireless communication device 610 a desired power level. Wireless communication device 610 could interpret these control signals and act in accordance to reduce transmission power of communications with base transceiver station 630.

As discussed above, wireless communication device 610 exchanges user communications with base transceiver station 630, and receives control signals from base transceiver stations 630-632. Base transceiver station 631 or 632 may want to influence the power level of wireless communication device 610 even though wireless communication device 610 is exchanging user communications with base transceiver station 630, not base transceiver stations 631 or 632. This may be the case, in some examples, when a noise level as perceived by base transceiver station 631 or 632 is made higher due to the transmissions of wireless communication device 610 with base transceiver station 630.

However, a reduction in power level of wireless communication device 410 may have adverse effects on its user communications exchange with base transceiver station 630. For example, wireless communication device 610 may be in an area where it must transmit at a high power level to maintain reliable user communications with base transceiver station 630. In other examples, wireless communication device 610 may be engaging in high bit rate activity facilitated by a high power level, and not desire to reduce the power level. Wireless communication device 610 cannot simply ignore the control signals from base transceiver stations 631 and 632 and continue to operate at a higher power level. If wireless communication device 610 were to do so, it may have adverse effects upon base transceiver stations 631 and 632.

If wireless communication device 610 is not exchanging user communications with base transceiver stations 631 or 632, but instead with another base transceiver station (i.e. BTS 630), then the user communications of wireless communication device 610 could be interpreted as interference or also contribute to the noise level at the base transceiver station that the wireless communication device is not communicating with (i.e. 631 or 632)—possibly leading to adverse effects upon base transceiver stations 631 or 632, such as degraded operations, degraded communications, or other adverse effects between base transceiver stations 631 or 632 and other wireless communication devices. Such adverse effects could include RF interference, communication interference, overpowering other signals, as well as lowering the quality-of-service, lowering the quality-of-experience, or inhibiting communications of other wireless communication devices exchanging user communications with base transceiver stations 631 or 632.

Wireless communication device 610 determines the estimated contribution of wireless communication device 610 to adverse effects or the noise at base transceiver station 631. Wireless communication device 610 could determine its estimated contribution by many methods. In one example, this method includes determining a signal-to-noise ratio at base transceiver station 631. In another example, this method includes determining a change in the signal-to-noise ratio at base transceiver station 631 caused by the user communication of wireless communication device 610 with base transceiver station 630. In yet another example, this method includes determining a change in the noise level at base transceiver station 631 caused by wireless communication device 610 exchanging user communications with base transceiver station 630.

If the estimated contribution to the adverse effects at base transceiver station 631 is below a certain threshold level, then wireless communication device 610 denies the control signal from base transceiver station 631. However, if the estimated contribution to the adverse effects at base transceiver station 631 exceeds a certain threshold, then wireless communication device 610 obeys the control signal from base transceiver station 631.

Wireless communication device 610 determines the estimated contribution of wireless communication device 610 to adverse effects at base transceiver station 632. Wireless communication device 610 could determine the estimated contribution by many methods, as discussed above with regards to base transceiver station 631. Additionally, when multiple base transceiver stations exist which are not exchanging user communications with wireless communication device 610, consideration could be given to all base transceiver stations transferring control signals to wireless communication device 610 when determining the estimated contribution.

In this manner, if the estimated contribution to the adverse effects at base transceiver station 632 is below a certain threshold, then wireless communication device 610 denies the control signal from base transceiver station 632. However, if the estimated contribution to the adverse effects or the noise at base transceiver station 632 exceeds a certain threshold, then wireless communication device 610 obeys the control signal from base transceiver station 632. Furthermore, if more than one base transceiver station indicates to wireless communication device 610 to operate at a lower power level, then wireless communication device 610 could determine to lower its power level regardless of its estimated contributions to noise levels at the base transceiver stations.

Advantageously, wireless communication device 610 maintains user communications with base transceiver station 630 without interfering or causing significant degradation in the operations of base transceiver stations 631 and 632. For example, wireless communication device 410 may be distant from base transceiver stations 631 or 632, while the exchange of user communications between wireless communication device 610 and base transceiver station 630 is not a significant contributor to the noise level at base transceiver stations 631 or 632. Likewise, in other examples, wireless communication device 610 may be distant from base transceiver stations 630-632, but in order to maintain user communications with base transceiver station 630, wireless communication device 610 must transmit user communications via high RF energy. If the estimated contribution of this user communication to the adverse effects at base transceiver stations 631 or 632 is below an acceptable level, then wireless communication device 610 could maintain a high RF transmission energy without inhibiting operations or communications of base transceiver stations 631 and 632.

Other wireless communication devices in communication system 600 could operate in manner described above for wireless communication device 610, although the configuration of the control signals and communications between the wireless communication devices and the base transceiver stations may vary in other examples.

FIGS. 1-6 and the preceding description depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication device, comprising:
    transferring user communications over a first wireless link to a first wireless access node;
    receiving a first control signal from the first wireless access node and receiving a second control signal from a second wireless access node, wherein the first control signal indicates a first power request for the user communications over the first wireless link of the wireless communication device and the second control signal indicates a second power request for the user communications over the first wireless link of the wireless communication device;
    determining an estimated contribution of the user communications over the first wireless link to a noise level at the second wireless access node; and
    denying the second control signal from the second wireless access node if the estimated contribution is below a threshold level.

2. The method of operating the wireless communication device of claim 1, wherein determining the estimated contribution of the user communications over the first wireless link to the noise level at the second wireless access node comprises processing a signal-to-noise ratio for the user communications between the wireless communication device and the first wireless access node.

3. The method of operating the wireless communication device of claim 1, wherein determining the estimated contribution of the user communications over the first wireless link to the noise level at the second wireless access node comprises processing a distance of the wireless communication device from the second wireless access node.

4. The method of operating the wireless communication device of claim 1, wherein determining the estimated contribution of the user communications over the first wireless link to a noise level at the second wireless access node comprises processing an increase in the noise level at the second wireless access node caused by the wireless communication device.

5. The method of operating the wireless communication device of claim 1, wherein the first control signal and second control signal each comprises a reverse activity bit.

6. The method of operating the wireless communication device of claim 1, wherein the first wireless access node and second wireless access node each comprise a wireless base station.

7. The method of operating the wireless communication device of claim 1, wherein the first wireless access node and second wireless access node are in different sectors of a wireless communication network.

8. A wireless communication device, comprising:
    a communication interface configured to transfer user communications over a first wireless link to a first wireless access node, receive a first control signal from the first wireless access node and a second control signal from a second wireless access node, wherein the first control signal indicates a first power request for the user communications over the first wireless link of the wireless communication device and the second control signal indicates a second power request for the user communications over the first wireless link of the wireless communication device; and
    a processing system configured to determine an estimated contribution of the user communications over the first wireless link to a noise level at the second wireless access node and direct the communication interface to deny the second control signal from the second wireless access node if the estimated contribution is below a threshold level.

9. The wireless communication device of claim 8, comprising:
    the processing system configured to process a signal-to-noise ratio for the user communications between the wireless communication device and the first wireless access node to determine the estimated contribution of the user communications over the first wireless link to the noise level at the second wireless access node.

10. The wireless communication device of claim 8, further comprising:
    the processing configured to process a distance of the wireless communication device from the second wireless access node to determine the estimated contribution of the user communications over the first wireless link to the noise level at the second wireless access node.

11. The wireless communication device of claim 8, further comprising:
    the processing system configured to process an increase in the noise level at the second wireless access node caused by the wireless communication device to determine the estimated contribution of the user communications over the first wireless link to the noise level at the second wireless access node.

12. The wireless communication device of claim 8, wherein the first control signal and second control signal each comprises a reverse activity bit.

13. The wireless communication device of claim 8, wherein the first wireless access node and second wireless access node each comprise a wireless base station.

14. The wireless communication device of claim 8, wherein the first wireless access node and second wireless access node are in different sectors of a wireless communication network.

15. A method of operating a wireless communication device, comprising:
- transferring user communications over a first wireless link to a first wireless access node;
- receiving a first control signal from the first wireless access node, a receiving a second control signal from a second wireless access node, and receiving a third control signal from a third wireless access node, wherein the first control signal indicates a first power request for the user communications over the first wireless link of the wireless communication device, the second control signal indicates a second power request for the user communications over the first wireless link of the wireless communication device, and the third control signal indicates a third power request for the user communications over the first wireless link of the wireless communication device;
- determining a first estimated contribution of the user communications over the first wireless link to a first noise level at the second wireless access node and determining a second estimated contribution of the user communications over the first wireless link to a second noise level at the third wireless access node; and
- denying the second control signal from the second wireless access node if the first estimated contribution is below a first threshold level and denying the third control signal from the third wireless access node if the second estimated contribution is below a second threshold level.

16. The method of operating the wireless communication device of claim 15, wherein determining the first estimated contribution of the user communications over the first wireless link to the first noise level at the second wireless access node comprises processing a first signal-to-noise ratio for the user communications between the wireless communication device and the first wireless access node and determining the second estimated contribution of the user communications over the first wireless link to the second noise level at the third wireless access node comprises processing a second signal-to-noise ratio for the user communications between the wireless communication device and the first wireless access node.

17. The method of operating the wireless communication device of claim 15, wherein determining the first estimated contribution of the user communications over the first wireless link to a first noise level at the second wireless access node comprises processing a first distance of the wireless communication device from the second wireless access node and determining the second estimated contribution of the user communications over the first wireless link to a second noise level at the third wireless access node comprises processing a second distance of the wireless communication device from the third wireless access node.

18. The method of operating the wireless communication device of claim 15, wherein determining the first estimated contribution of the user communications over the first wireless link to the first noise level at the second wireless access node comprises processing an increase in the noise level at the second wireless access node caused by the wireless communication device and determining the second estimated contribution of the user communications over the first wireless link to the second noise level at the third wireless access node comprises processing an increase in the noise level at the third wireless access node caused by the wireless communication device.

19. The method of operating the wireless communication device of claim 15, wherein the first control signal, second control, and third control signal each comprises a reverse activity bit.

20. The method of operating the wireless communication device of claim 15, wherein the first wireless access node, second wireless access node, and third wireless access node each comprise a wireless base station.

21. The method of operating the wireless communication device of claim 15, wherein the first wireless access node, second wireless access node, and third wireless access node are in different sectors of a wireless communication network.

22. A wireless communication device, comprising:
- a communication interface configured to transfer user communications over a first wireless link to a first wireless access node, receive a first control signal from the first wireless access node, a second control signal from a second wireless access node, and a third control signal from a third wireless access node, wherein the first control signal indicates a first power request for the user communications over the first wireless link of the wireless communication device, the second control signal indicates a second power request for the user communications over the first wireless link of the wireless communication device, and the third control signal indicates a third power request for the user communications over the first wireless link of the wireless communication device; and
- a processing system configured to determine a first estimated contribution of the user communications over the first wireless link to a first noise level at the second wireless access node, determine a second estimated contribution of the user communications over the first wireless link to a second noise level at the third wireless access node, direct the communication interface to deny the second control signal from the second wireless access node if the first estimated contribution is below a first threshold level, and direct the communication interface to deny the third control signal from the third wireless access node if the second estimated contribution is below a second threshold level.

23. The wireless communication device of claim 22, comprising:
- the processing system configured to process a first signal-to-noise ratio for the user communications between the wireless communication device and the first wireless access node to determine the first estimated contribution of the user communications over the first wireless link to the first noise level at the second wireless access node and process a second signal-to-noise ratio for the user communications between the wireless communication device and the first wireless access node to determine the second estimated contribution of the user communications over the first wireless link to the second noise level at the third wireless access node.

24. The wireless communication device of claim 22, further comprising:
- the processing configured to process a first distance of the wireless communication device from the second wireless access node to determine the first estimated contribution of the user communications over the first wireless link to the first noise level at the second wireless access node and process a second distance of the wireless communication device from the third wireless access node to determine the second estimated contribution of the user communications over the first wireless link to the second noise level at the third wireless access node.

25. The wireless communication device of claim 22, further comprising:
- the processing system configured to process an increase in the noise level at the second wireless access node caused by the wireless communication device to determine the first estimated contribution of the user communications over the first wireless link to the first noise level at the second wireless access node and process an increase in the noise level at the third wireless access node caused by the wireless communication device to determine the second estimated contribution of the user communications over the first wireless link to the second noise level at the third wireless access node.

26. The wireless communication device of claim 22, wherein the first control signal, second control signal, and third control signal each comprises a reverse activity bit.

27. The wireless communication device of claim 22, wherein the first wireless access node, second wireless access node, and third wireless access node each comprise a wireless base station.

28. The wireless communication device of claim 22, wherein the first wireless access node, second wireless access node, and third wireless access node are in different sectors of a wireless communication network.

* * * * *